(12) United States Patent
Cross et al.

(10) Patent No.: US 6,754,588 B2
(45) Date of Patent: Jun. 22, 2004

(54) METHOD OF PREDICTING THREE-DIMENSIONAL STRATIGRAPHY USING INVERSE OPTIMIZATION TECHNIQUES

(75) Inventors: Timothy A. Cross, Evergreen, CO (US); Margaret A. Lessenger, Golden, CO (US)

(73) Assignee: Platte River Associates, Inc., Boulder, CO (US)

( * ) Notice: Subject to any disclaimer, the term of this patent is extended or adjusted under 35 U.S.C. 154(b) by 102 days.

(21) Appl. No.: 09/855,757

(22) Filed: May 15, 2001

(65) Prior Publication Data

US 2002/0099504 A1 Jul. 25, 2002

Related U.S. Application Data

(63) Continuation-in-part of application No. 09/239,634, filed on Jan. 29, 1999, now Pat. No. 6,246,963.

(51) Int. Cl.[7] ................................................ G01V 1/28
(52) U.S. Cl. ................................... 702/11; 702/17
(58) Field of Search ........................ 702/6–14, 16, 702/18; 367/72, 73; 703/10

(56) References Cited

U.S. PATENT DOCUMENTS 5,798,982 A * 8/1998 He et al. ........................ 702/13
5,835,883 A * 11/1998 Neff et al. ..................... 702/13

* cited by examiner

Primary Examiner—Donald E. McElheny, Jr.
(74) Attorney, Agent, or Firm—James R. Young; Faegre & Benson

(57) ABSTRACT

The invention relates generally to the field of quantitative sedimentologic and stratigraphic prediction. Specifically, geological data observed or inferred from core samples, cuttings, geophysical well logs and seismic data from locations within a sedimentary basin, in conjunction with a stratigraphic forward model and an inverse optimization technique, are used to predict sedimentologic and stratigraphic attributes at locations within the basin other than those at which data were collected. The model's output consists of a three-dimensional model of the sedimentologic and stratigraphic attributes for the specified basin volume.

6 Claims, 14 Drawing Sheets

(10 of 14 Drawing Sheet(s) Filed in Color)

Seismic line shown in two-way travel time (ms). Trace of seismic profile from Eberli et al., 1997, ODP v. 166 (reversed). Wells shown as vertical lines.

METHOD OF PREDICTING THREE-DIMENSIONAL STRATIGRAPHY USING INVERSE OPTIMIZATION TECHNIQUES

CROSS-REFERENCE TO RELATED PATENT APPLICATION

This patent application is a continuation-in-part of U.S. patent application Ser. No. 09/239,634, filed on Jan. 29, 1999, now U.S. Pat. No. 6,246,963.

BACKGROUND OF INVENTION

1. Field of Invention

This invention relates generally to the field of quantitative sedimentologic and stratigraphic prediction, and more specifically, to quantitative prediction of sedimentologic and stratigraphic attributes at all locations within a basin, especially those that are remote from a set of specific data sampling locations. Sedimentologic and stratigraphic prediction is an important step in the discovery and recovery of oil, gas, and water resources.

2. Description of Relevant Art

Sedimentology is the study of rocks that are formed by: (1) the deposition of rock fragments which have been transported from their source to another location by water and/or air (e.g., sandstone and shale); (2) precipitation of minerals from a liquid or solution (e.g., salt, gypsum); and (3) remains (shells, skeletons and organic matter) of organisms (e.g., limestone, coal). Sedimentary rocks are deposited in layers known as strata. Stratigraphy is the study of the origin, composition, distribution and succession of these strata.

Oil and gas reservoirs and groundwater resources occur in sedimentary basins filled with strata of diverse compositions that contain fluids (water, oil, gas) in variable proportions and spatial distributions. The distribution of fluids is strongly controlled by petrophysical (e.g., porosity and permeability) and geometric (e.g., continuity and connectivity) properties of strata.

To recover petroleum from these reservoirs typically requires drilling through thousands of feet of overlying rock. The drilling of oil and gas wells is normally a very expensive endeavor. Consequently, before incurring this expense, those involved in the exploration for or production of oil and gas reservoirs seek to obtain an understanding of the basin geology and, in particular, the basin sedimentology and stratigraphy, so that an oil or gas well is drilled in a location that is most likely to achieve an economic success. In oil and gas exploration, geologic and seismic data are used to predict the location of sedimentary rocks and structures that are likely to contain an oil or gas reservoir. In developing (producing) an oil or gas reservoir, geologic and seismic data are used to predict locations for drilling wells that will facilitate the extraction of more petroleum from the identified reservoir.

In groundwater and contaminant transport modeling, the scientific problems of correctly identifying the fluid-flow pathways are the same as they are for oil and gas exploration and production, even though groundwater typically occurs at much shallower depths. It is widely appreciated that the biggest problem in groundwater and contaminant transport modeling is the definition of subsurface stratigraphy.

Presently, several techniques are used to obtain direct or indirect information about sedimentologic and stratigraphic attributes. A common technique is seismic surveying, which involves: (1) transmitting sound waves from the surface into the earth; (2) recording the waves that are reflected back to the surface when the transmitted wave encounters interfaces between strata, fractures and other discontinuities that reflect acoustic waves in the underlying earth; and (3) analyzing the reflected signals to make geological inferences about sedimentary rocks and fluids encountered by the waves as they propagate through the earth. Seismic methods obtain indirect information (inferences) about rocks and fluids only at the sites of the seismic line. Other common techniques include coring cuttings and well logging, which involve taking samples of the various rocks and fluids encountered as a well is drilled, and inserting various instruments into the well to measure various rock and fluid properties. These techniques obtain direct and indirect information only at the coring or well sites.

Most techniques for obtaining sedimentologic and sedimentary data or inferences about their attributes are relatively expensive. Moreover, the results obtained from such techniques are limited and applicable only to the locations at which the data are taken; i.e., the data obtained by any one of these techniques at a particular location are not necessarily representative or predictive of the stratigraphy as it exists beyond a short radial distance from the precise location at which the data were taken. As a consequence, any conclusions drawn with respect to sedimentological and sedimentary attributes are subject to increasing uncertainty as the location of interest becomes increasingly remote from the locations at which the data are taken. Equally important, the information is indirect, that is, the information generated are no more than geological inferences from proxy measurements. Because of these limitations, a model is needed that accurately predicts stratigraphical attributes within a given basin from a small number of data sets.

In the parent application, Ser. No. 09/239,634, filed on Jan. 29, 1999, applicant disclosed a method that solves such a problem in that it accurately predicts basin stratigraphy at locations remote from where initial geologic data sets are collected. The disclosed method utilizes data collected from a few distinct locations within a desired basin. These data are compared to a predicted set of data generated from a forward stratigraphic model that is fed a set of values for the model process parameters. The predicted and the actual data sets are compared, and if the difference is greater than a predetermined limit, the model is run again with the parameter values modified. This process is repeated until the predictions fall within the predetermined limit and are close to the measurements taken at the sample locations. In the parent application, the predicted data set produced an accurate two-dimensional depiction of the sedimentologic and stratigraphic attributes of the desired basin thus providing a significant advance over other existing modeling techniques. However, the disclosed method of the parent application lacked the capability to generate a three-dimensional model of the sedimentologic and stratigraphic attributes of the desired basin.

SUMMARY OF THE INVENTION

Accordingly, this invention is directed to using geological data generated from one or more locations to accurately predict the stratigraphy at a location or locations remote from where the geological data were initially collected to produce a three-dimensional model of the sedimentologic and stratigraphic attributes of the desired basin. In particular, geological data gathered at a specific location can be input into the disclosed process and the stratigraphy for a location as much as tens of kilometers or as close as tens of meters away from the initial data point can be accurately predicted.

The ability to predict the stratigraphy is accomplished using a mathematical optimization technique known as inversion.

Quantitative stratigraphic predictions made using inversion techniques reduce risks associated with exploration and production of oil and gas, or definition of fluid-flow pathways in ground water, and enhance interpretations or predictions made from other available data sets. For instance, quantitative prediction of the stratigraphy can be used to: (1) refine what has been inferred about the stratigraphy at a remote location by other techniques; (2) explain what a particular seismic image means in terms of rock type or other stratigraphic property; (3) extend with greater confidence information recovered from a well to a volume of rock a significant distance from the well; or (4) eliminate stratigraphically unreasonable solutions from a population of possible solutions of subsurface geology predicted by other techniques.

In the context of sedimentology and stratigraphy, inversion involves the use of: (1) a forward model to predict stratigraphy throughout a sedimentary basin based upon the values of realistic input parameters; (2) real stratigraphic data from a relatively small number of distinct locations within the sedimentary basin; and (3) an inversion technique that: (a) determines the difference between the measured stratigraphic data and the predictions made by the forward model for the locations at which the real stratigraphic data were obtained; and (b) if the differences are unacceptable, modifies the values of the input parameters to the forward model to achieve a closer match between the predicted stratigraphic attributes and the measured or observed stratigraphic attributes. The process of using the forward model to predict the stratigraphy throughout the basin and the modification of the values of the input parameters continues until the predictions made by the forward model for the locations associated with the real stratigraphic data match or are reasonably close to the real stratigraphic data. At this point, the forward model has been tuned such that it accurately predicts the stratigraphy not just at the locations associated with the real data, but also at other locations within the three-dimensional volume that are remotely situated from the sample locations.

Even though mathematical inversion has been applied in a number of geoscience and geoengineering applications (including seismic signal processing, well logging, potential field geophysics, petrophysics, hydrology, contaminant transport and oil maturation analysis), it had not been applied to stratigraphic analysis or to prediction of rock attributes beyond and/or between points of control until the applicant did so in the parent application. One principal reason that inversion had not been applied to stratigraphic analysis is that it was regarded for a long time as theoretically impossible. Ian Lerche, one of the world's leaders in applying inverse and other optimization techniques to geoscience and geoengineering problems, co-authored an influential paper in 1987 which concluded that the application of inversion and other optimization techniques to the analysis of sedimentary rocks was theoretically impossible (Burton, et al., 1987).

The conclusion by Burton, et al., that inversion of stratigraphic data was theoretically impossible was based upon their determination that the different processes involved in producing the stratigraphy of a sedimentary basin and the different parameter values (e.g., magnitude, rates) associated with these processes can substitute or compensate for each other to produce the same stratigraphy in the sedimentary basin of interest. If different combinations and values of processes can substitute for each other to produce the same stratigraphy, then it is impossible to uniquely determine the values of the input parameters of the forward model to accurately predict the stratigraphy over a three-dimensional volume. In mathematical terms, this condition is known as nonuniqueness.

In the development of the present invention, it was discovered that the nonuniqueness conclusion reached by Burton, et al., was attributable to two aspects of the forward model that they employed. First, the philosophies incorporated in the forward model reflected stratigraphic paradigms which are now known not to be true, including: (1) the assumption that stratigraphic processes substitute for each other to produce identical products; (2) a belief that the stratigraphic record is dominantly composed of the deposits of rare, haphazard events that lack pattern and which, are therefore, not invertible; (3) that conservation of mass is not a requirement of the stratigraphic process-response system; and (4) that so much opf the rock record is missing—a condition known as stratigraphic gaps—that remaining information is not sufficient to reconstruct the stratigraphic history and the current distribution of different rock types. Second, their forward model used to test whether inversion could be applied to stratigraphy was a strictly geometric model, and did not simulate the process-response system of the real world adequately nor simulate stratigraphic properties such as facies successions and cycles which has been found to contain robust information.

The disclosed invention employs a forward model that models the processes associated with creating the stratigraphy in a sedimentary basin. In this regard, conservation of mass is identified as being a key component of the stratigraphic process-response system emulated by the forward model. Another is simulating stratigraphic, sedimentologic and biologic processes in the energy domain (i.e., potential, kinetic, chemical and biologic energy). Further, the types of geological data that have a significant impact on comparing forward model predictions with observations, i.e., robust types of data, have been identified and incorporated into the forward model.

Among the mathematical inversion techniques that are suitable for use in the disclosed invention are the genetic, the simulated annealing, the Monte Carlo, the gradient descent, and the technique designed by Ian Lerche. Since the inversion technique typically requires a number of forward model iterations (repeatedly running the forward model and modifying the input parameters) before the forward model produces an accurate prediction of the stratigraphy, the speed at which the forward model system operates may be of concern in some applications. Presently, the Lerche and the simulated annealing inversion techniques are found to be the fastest and best suited optimization techniques for this application.

Aside from predicting stratigraphy for oil and gas operations, the disclosed invention is equally applicable to groundwater hydrology and contaminant transport modeling as will be appreciated by those persons skilled in the art. Additionally, persons skilled in the art will recognize that stratigraphic inversion provides a quantitative link among geoscience and geoengineering disciplines. Som of these allied disciplines routinely apply inverse methods predict rock or fluid attributes from observations and models appropriate to their disciplines. None of these allied disciplines, however, has used a stratigraphic forward model in the inversion. For example, hydrology uses Darcy flow forward models, seismic geophysics uses some form of the wave equation as its forward model, and well bore geophysics uses a petrophysical forward model. The result of inversions of each disciplinary model is a population of solutions that presumably contain the correct solution. Each of these disciplines is attempting to identify a correct stratigraphy or fluid distribution based upon knowledge, models and data from one data type.

Thus this invention also discloses the performance of simultaneous inversions on multiple data types from two or more disciplines. Without a quantitative method of predicting stratigraphy, those persons skilled in the art of other geoscience or geoengineering disciplines have not been able to link these disciplines and perform simultaneous inversions on multiple data types. As an example, inversions on fluid data (e.g., pressure, head, composition, gas/oil ratio, historical production and pressure decline) using a Darcy forward model produces a population of models that describe likely fluid-flow (gas, oil or water) pathways through strata, independent of any stratigraphical information. Some of these solutions are geologically possible; others are geologically unrealistic. Similarly, stratigraphic inversion on the same strata, independent of information about fluid distribution and flow pathways, produces a population of solutions of which some are unrealistic with respect to fluid distribution. By simultaneously inverting on both fluid and rock data types, a smaller population of solutions is calculated and unrealistic solutions are eliminated. Since inversions on one data type eliminate a portion of possible solutions calculated by inversions on a different data type, the number of possible solutions and uncertainty are reduced, and accuracy is enhanced.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

The disclosed process comprises the use of a stratigraphic forward model with an inverse model to make stratigraphic predictions within a given basin at points remote from locations from which data sets were collected. To achieve accurate stratigraphic prediction from limited, incomplete, patchy data, the forward model must be invertible. This requires that it run fast, that it contain multiple, adjustable process-response parameters, that the stratigraphic process-response system is accurately simulated with linear and nonlinear functions, as appropriate, and that the stratigraphic data are comparable to model output. Successful stratigraphic inversion also requires observable data types that contain sufficient, robust information so as to eliminate or reduce the nonuniqueness problem discussed herein. The invention disclosed herein expressly incorporates the disclosure of its parent application, Ser. No. 09/239,634, filed on Jan. 29, 1999, and uses a similar methodology to provide a three-dimensional model that is useful for predicting stratigraphic basin attributes remote from the locations where the initial source data were generated.

Figure 1:
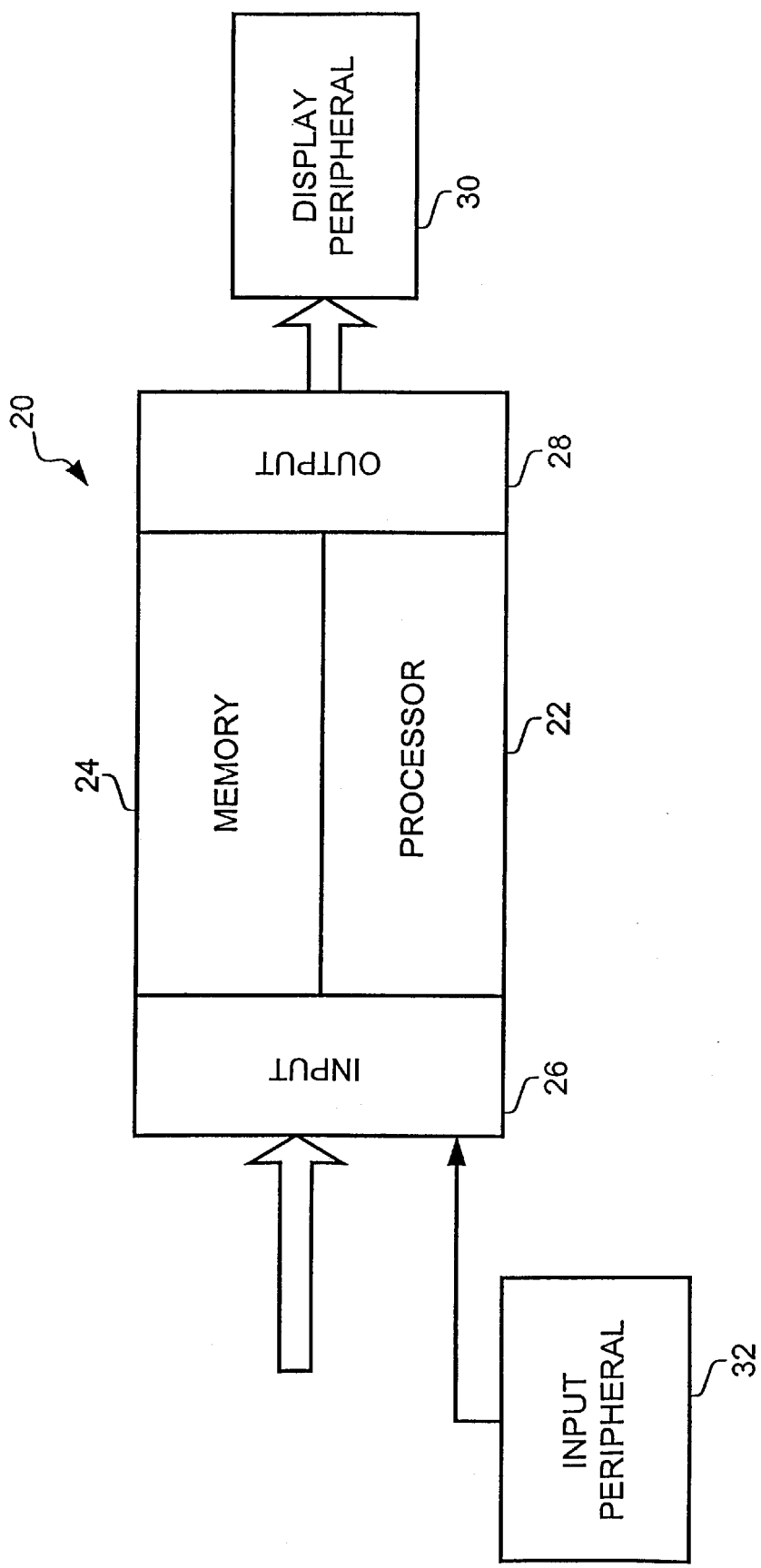
FIG. 1 is a block diagram of a computer system that is used to implement the invention.

The method for predicting stratigraphy is implemented on a computer system that executes an inverse model program. With reference to FIG. 1, a computer system 20 that is suitable for implementing the stratigraphic inverse model includes a processor 22 for executing the stratigraphic inverse model program; a memory 24 for storing the program and data used by the program; an input port 26 for receiving the data that is used by the program; and an output port 28 for transmitting the results produced by the program and information that may be needed for an operator to interact with the program to a display peripheral 30. The input port 26 may be operatively connected to an input peripheral 32 that permits an operator to specify data that are used by the program or to otherwise interact with the program. The input peripheral 32 can take any number of forms, including a keyboard and/or mouse. The display peripheral 30 is typically either a color monitor or a color printer, because colors are convenient for distinguishing rock types and strata. It should, however, be appreciated that other types of display peripherals are feasible and other means, such as patterns, can be used to distinguish strata from one another.

Figure 2:
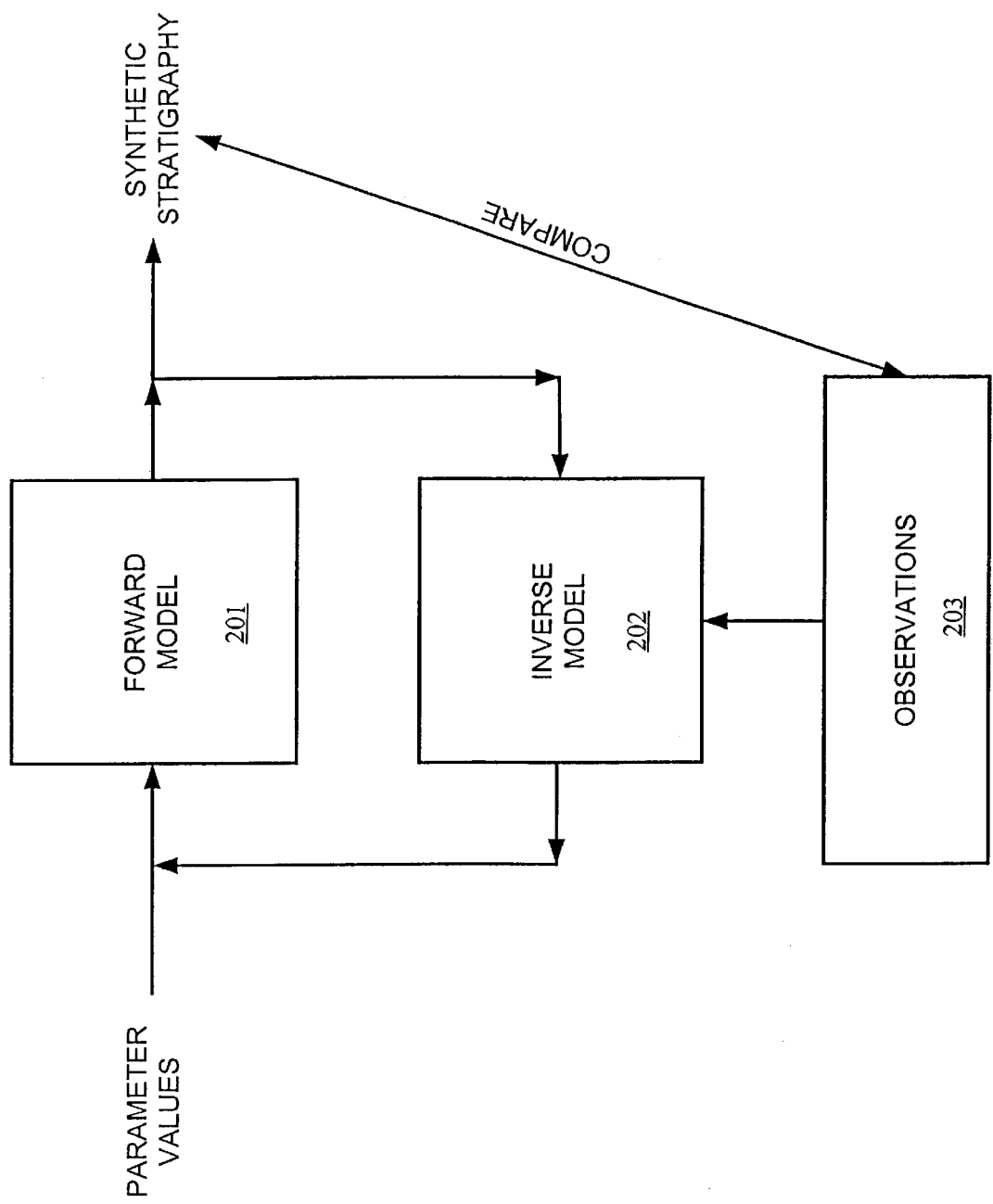
FIG. 2 is a block diagram of a stratigraphic inverse model of the present invention.

With reference to FIG. 2, the stratigraphic inverse model that is implemented in the program has three main components: (1) observations 203 (samples) from a stratigraphic data set; (2) a stratigraphic forward model 201 that uses values of process parameters to make predictions about stratigraphic attributes; and (3) an inverse model 202 that modifies the values of the forward model parameters such that a better match is obtained between predictions and observations when the forward model 201 is subsequently reexecuted. Each of the three main components are disclosed in greater detain through the use of the example shown below.

Although those persons skilled in the art would recognize that other forward models might work—provided they conform to some fundamental requirements such as short running time, conservation of mass, and simulation of properties comparable to robust observable data types—this particular three-dimensional stratigraphic model embodiment simulates carbonate sediment production, redistribution and accumulation from the inundation flat (i.e., tidal flat, sabhka), across the shelf or ramp, to the deep marine basin. Topographic variations, such as biologically constructed reefs, current- and wave-generated mounds, midshelf basins and lagoons also are simulated. Siliciclastic input is not simulated. The carbonate model is designed to simulate stratigraphy at reservoir to basin scales. Skeletal productivity and sediment redistribution and accumulation are placed within stratigraphic (time/space) and energy contexts. The carbonate model also employs a flexure algorithm to compensate for sediment and water loads.

The carbonate model disclosed is designed to realistically simulate the stratigraphic process-response system of carbonate environments even though the algorithms used for simulations are simplifications and proxies of the actual operations. From this realism requirement follow several other attributes of the model: (1) the model conserves mass and energy; (2) the model expresses relations between physical energy (potential and kinetic energy) and biologic energy; (3) the model expresses relations between hydromechanical energy on the sea floor and sediment texture; (4) carbonate (skeletal) productivity is related to physical energy, water depth, distance from land, and ecologic (r and K adaptive strategies) factors; (5) sediment accumulation is a balance between in-place production and transport into and out of a particular geographic location as a function of hydromechanical energy; (6) the model simulates hydromechanically constructed shoals and biologically constructed mounds and reefs along shelf margins and distributed on shelves, platforms or ramps; and (7) the model simulates the evolution from ramp to platform (either rimmed or not rimmed) without that evolution being expressly dictated by the model algorithms and logic.

The carbonate model has numerous invertible parameters that permit comparison between model predictions and geologic observations. These include: topography (bathymetry); sea level; subsidence; carbonate productivity as a function of water depth, kinetic energy, distance from shore and ecologic reproduction strategy; hydromechanical (kinetic) and potential energy on the sea floor; flexural compensation; spatial and temporal variations in the model; subaerial exposure of the shelf; and hardground production by sediment starvation.

Data types useful for comparison to model parameters include: water depth; texture; correlated stratigraphic units, (e.g., cycles, sequences, genetic units); ecologic units (e.g., reef, biologically constructed mound, hydro-mechanically constructed shoal); environmental units (e.g., lagoon, ramp, rimmed platform, platform, shoal, open shelf, etc.); and geometry. Although temporal information in the form of correlated cycles and/or absolute ages may enhance model resolution and accuracy, this data type is not essential to inverting the model.

There are two principal energy domains for which the three-dimensional carbonate model must account. The first is the physical energy domain and includes a multitude of sedimentologic, ecologic and stratigraphic conditions. One form of energy within the physical energy domain is hydromechanical, or kinetic energy. Hydromechanical energy at the sea floor determines to a large degree the texture of the sediment which accumulates and the volume of sediment which is delivered to or removed from a site. If organisms produce $CaCO_3$ at a site in the form of shells, tests or skeletons, some of this newly produced material may be removed from the site and waves and currents may modify the texture. Large particles produced by organisms are constantly disintegrating into smaller particles and mud through a variety of biologic and mechanical processes, and the resulting finer material may be winnowed by currents and waves. The energy of waves and currents on the sea floor also contributes to the formation of biologic reefs and mounds, and biodetrital shoals.

Input of hydromechanical energy is in the form of waves from sea swell and from waves generated locally by wind stress on the water surface. Geometry of the coastline and shelf, and water depth and gradient of the shelf contribute to transforming some wave energy into current energy. The energy of waves and currents dissipates by friction with the sea floor; thus, the hydromechanical energy at the sea floor is modified by the water depth and gradient of the sea floor. Shelf-margin barriers (shoals, reefs) are a special case where the mechanical energy from the sea swell is dissipated by friction with the sea floor, wind stress on the water surface amplifies waves and currents especially during storms and over broad, deep shelves. Generally, as the shelf width increases, hydromechanical energy generated locally by wind stress increases.

A second form of energy within the physical energy domain is potential energy. Potential energy is created by the natural shoreline to basin gradients, the water depth of the sea floor, the topography created by organisms (reefs and mounds) and by currents and waves (biodetrital and ooid/pelletal shoals), and by storm setup at the coastline. Potential energy may be exchanged for hydromechanical energy. The topography of sea floor is determined by a three-dimensional diffusion of energy, not by diffusion of topography as is common practice in stratigraphic modeling. This creates a natural feedback mechanism between potential and hydromechanical energy and depositional topography.

The consequence of these interactions is a nonlinear behavior of kinetic energy with respect to multiple parameters. Generally, kinetic energy generated by wind stress on the water surface and sea swell is very low on the sea floor below storm wave base and increases toward fairweather wave base and then to sea level. At the same time, energy loss due to friction with the sea floor causes a decrease in kinetic energy with decreasing water depth. Kinetic energy on the sea floor increases toward coastlines of the mainland, shoals and islands, and decreases on the leeward side of barriers.

The second energy domain, including ecologic and biologic energy parameters, is referred to as the biological energy domain, and it is related to the physical energy domain. Generally, organisms produce more $CaCO_3$ skeletal material in shallower and higher energy water. Waves and currents contribute to the construction of biologic mounds and biodetrital shoals. Populations of organisms that compose the ecologic community change through time as a function of changes in reproduction strategies related to rates of increasing and decreasing water depths and degree of ecologic stability. The major sedimentologic and stratigraphic consequences are differentiation in the amount of biologic energy devoted to production of skeletal material versus production of soft tissue. The biologic energy domain will be discussed subsequent to the formulation of the physical energy domain modeling equations.

The objective of the three-dimensional carbonate model simulation is to capture as much as possible of the process-response systems as well as feedback loops and buffers which are related to hydromechanical and potential energy. The total energy released to sediment transport consists of potential (topographic) and kinetic (hydromechanical) energy. This is expressed as:

$$E = E_p + E_k \tag{1}$$

Because of the computational efficiency and the absence of a need to expressly describe the kinetic energy of the water mass, the model does not exact hydrodynamic calculations of water kinetic energy. Instead, a stratigraphic approximation is used to design a function, F, that calculates an average kinetic energy on the sea floor over stratigraphic- and model-scale durations ($10^3$ years). This function contains the variables of space (x, y, and sea floor elevation, H ) and time. Without fully describing the function F(H, x, y, t) at this point, total energy within the physical energy domain can be expressed as:

$$E = \rho g H + F(H, x, y, t) \quad (2)$$

where $\rho$ is water density and g is gravity.

The hydromechanical energy on the sea floor contributed by sea swell decreases in a landward direction due to friction with the sea floor. The decrease is proportional to distance (shelf width) and inversely proportional to water depth. Shelf width and water depth are described by sea floor gradient. This decrease in energy caused by friction is described as a mechanical resistance, and the kinetic energy is inversely proportional to resistance. There is little resistance in deep water, but the resistance begins to increase at storm wave base. The function, F, illustrated in equation 3, describes this inverse proportionality of kinetic energy to resistance. Equation 3 substitutes for F in the right term of equation 2 above.

$$F = \frac{k\left(\frac{\arctan(k_w(W_b - W_d))}{\pi} + 0.5\right)}{\sqrt{1 + \int_{y_0}^{y}\left(\frac{k_r}{1 + e^{k_h W_d}}\right) dy}} + kDist \quad (3)$$

In this equation, the denominator describes the summed resistance at position y which is some distance from the ocean side of the model. The coefficient $k_r$ describes the amplitude of the resistance, and $k_h$ describes the rate of resistance increase caused by decreasing water depth $W_d$. In the coordinates of the model, y is parallel to the mean vector of the incoming sea swell (negative toward land), and $y_0$ is the starting point at the open ocean side of the model.

Figure 11:
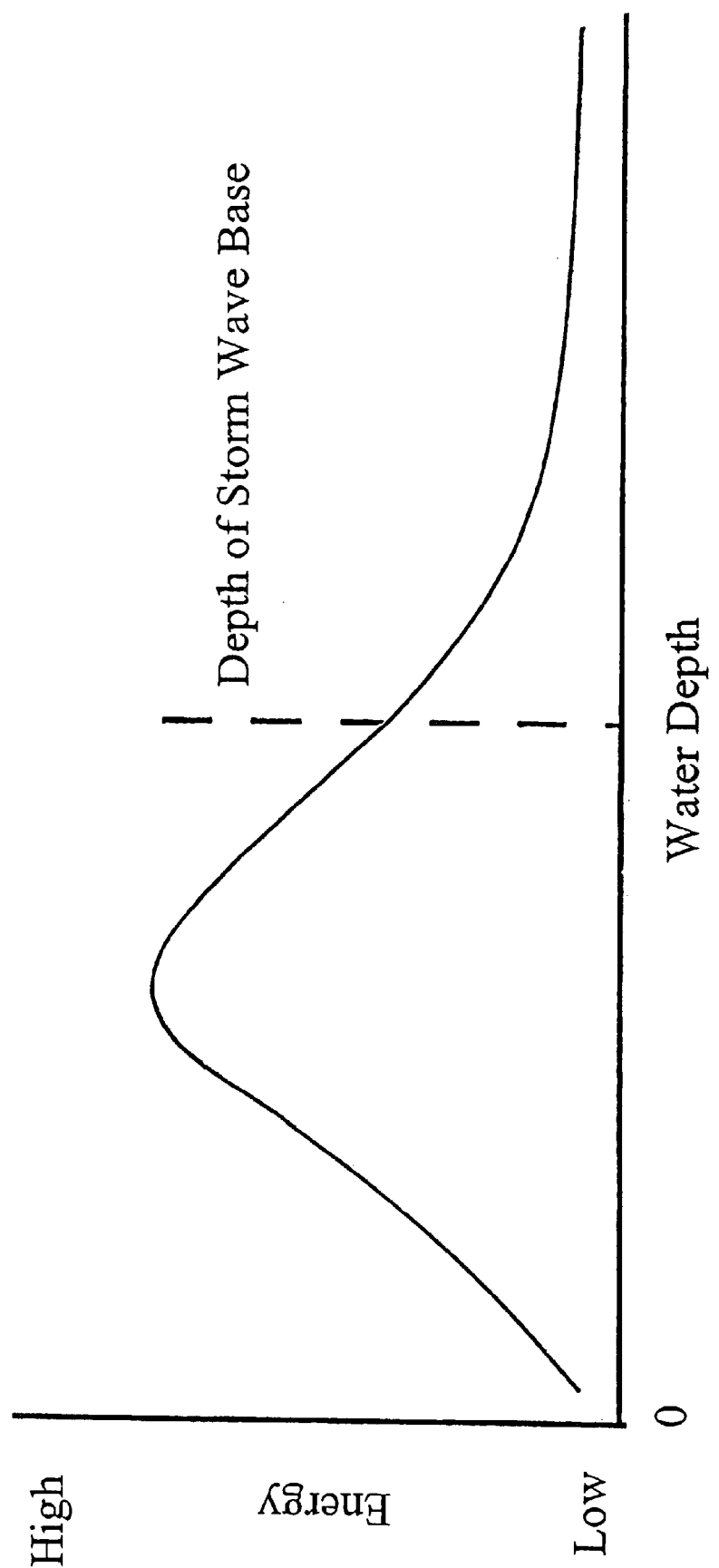
FIG. 11 illustrates the inverse proportionality of hydromechanical kinetic energy to mechanical resistance on the sea floor.

The numerator returns a value between 0 and 1. It adjusts the amplitude of the resistance for variable water depths compared to storm wave base. If the sea floor is below storm wave base, $W_b$, the value approaches 0, and there is little energy at the sea floor. When the water depth ($W_d$) is shallow and the sea floor is above the wave base, the value of approaches 1. The numerator compensates for the very high resistance (and therefore, very low energy) at vary shallow depths calculated by the denominator. The numerator decreases the resistance and increases the energy at very shallow depths that are calculated by the denominator. The curve produced by the function, F (equation 3), has the shape of the graph shown in FIG. 11. The coefficient, $k_w$, describes the resistance amplitude of the ratio of the wave base to the water depth ($W_b/W_b$). The coefficient, k, describes the amplitude of the whole function, F.

In summary, function F of equation 3 calculates the energy on the sea floor created by sea swell as a function of distance from the impinging swell, water depth and gradient. The energy level is very low when the sea floor is well below storm wave base. It increases toward wave base and reaches a maximum around fairweather wave base. It then decreases again in very shallow water. These general conditions are modified by distance of travel of the swell and waves, and by sea floor topography (e.g., barriers, mounds, reefs, lagoons).

The kinetic energy at the sea floor contributed by sea swell would dissipate completely in many topographic configurations, such as very shallow shelves and platforms with rimmed margins. Yet such shelves have sufficient current and wave energy to create shoals and move grainy sediment around. This energy is contributed by local wind stress on the water surface, particularly during storms. As the shelf width increases, there is more area over which storms can pass new energy into the water column, and this energy is translated to the sea floor over large areas (100s of $km^2$) of the shelves. Currently, this energy is added due to wind stress as gradient kDist (equation 3) of increasing energy toward land; the wider the shelf, the greater the energy. The energy contributed by wind stress on the water is proportional to the fetch of the shelf.

Sediment transport and texture must next be added to the carbonate model. Sediment transport and sediment flux, q, are assumed proportional to the kinetic and potential energy of the sea floor. The texture of the sediment, which governs porosity and permeability, is related to the hydrodynamic energy, $E_k$. As described later, the model conserves mass. Consequently, sediment production, sediment transport and sediment accumulation may be described in terms of a sediment flux that has directional properties. Sediment flux is always from higher to lower energy conditions on the sea floor, and both potential and kinetic energy contribute to the flux direction. The sediment flux in the east-west (x dimension) directions of model space is defined by:

$$q_x = -D_x \frac{\partial(\rho g H)}{\partial x} + D_x F_x \quad (4)$$

The sediment flux in the north-south (y dimension) directions of model space is defined by:

$$q_y = -D_x \frac{\partial(\rho g H)}{\partial y} + D_y F_y \quad (5)$$

In these equations, the negative symbol indicates that the direction of sediment transportation is toward decreasing energy on the sea floor. The first term of each equation is the potential energy, and the second term is the kinetic energy function F derived in equation 3. The coefficients $D_x$ and $D_y$ are in the x and y directions, respectively. In summary, sediment flux is proportional to the total energy conditions on the sea floor. This approach takes advantage of using one calculation for energy to directly derive another property of the model, which in this case, are sediment transport, accumulation and texture. At this point in the model development, what absolute values of energy translate into which textures are not yet known. The values for conversion will be determined by experiment and the results of inversion.

One of the requirements of applying stratigraphic inversion to real-world data is that the forward model must conserve mass. Either mass must be conserved completely within the model space, or other boundary conditions of flux must be given. The requirement of mass conservation creates causal links within the model space that mimic the natural process-response system and severely constrain the forward model solutions that are geologically reasonable.

In the carbonate model, sediment mass is conserved within the three-dimensional carbonate model volume. The incremental increase of mass over a model time step is equal to the biological $CaCO_3$ production over the entire model space. Sediment mass is redistributed as a function of the hydromechanical and potential energy on the sea floor. The volume (mass), V, of sediment at a particular geographic location is equal to the mass produced in situ plus the mass transported to that cell, less the mass transported out. This is expressed as:

$$V_{deposit} = V_{production} + V_{input} V_{output} \quad (6)$$

Since the flux of sediment has directional properties, from positions of higher to lower energy within the model space, the change in sediment mass at each position for each step must contain the variables of space (x, y, and sea floor elevation, H) and time. Thus, the terms of equation 6 may be rewritten as:

$$V_{deposit} = \Delta h \Delta x \Delta y \quad (7)$$

$$V_{production} = P \Delta x \Delta y \Delta t \quad (8)$$

$$V_{input} = V_{input_x} + V_{input_y} = q_x(x)\Delta y \Delta t + q_y(y)\Delta x \Delta t \quad (9)$$

$$V_{output} = V_{output_x} + V_{output_y} = q_x(x+\Delta x)\Delta y \Delta t + q_y(y+\Delta y)\Delta x \Delta t \quad (10)$$

The terms $V_{input} - V_{output}$ are simplified as:

$$V_{input} - V_{output} = (q_x(x) - q_x(x+\Delta x))\Delta y \Delta t + (q_y(y) - q_j(y+\Delta y))\Delta x \Delta t \quad (11)$$

The terms $q_x(x+\Delta x)$ and $q_y(y+\Delta y)$ may be rewritten by Taylor expansion as $q_x(x) + \Delta x q'_x(x)$ and $q_y(y) + \Delta y q'_y(y)$, respectively. With substitution, this yields:

$$V_{input} - V_{output} = \Delta x \Delta y \Delta t q'_x(x) - \Delta x \Delta y \Delta t q'_y(y) \quad (12)$$

or:

$$V_{input} - V_{output} = -\left(\frac{\partial q_x}{\partial x} + \frac{\partial q_y}{\partial y}\right)\Delta x \Delta y \Delta t \quad (13)$$

The second energy domain, the biological energy domain, is described in terms of a function, P, and represents biologic sediment production. As those persons skilled in the art will appreciate, all previously developed carbonate forward models treat carbonate production rates from a biologic perspective. In this perspective, carbonate production by organisms is a function of light penetration, salinity, nutrient availability, turbidity and temperature. Benthic organisms dominate carbonate production, and some studies indicate that the benthic/planktic production ratio is around 1000:1. Carbonate production is maximum in the shallow part of the photic zone and declines downward until it approaches zero well below the photic zone. The factors that contribute to the depth or thickness of the photic zone are water depth and turbidity. Turbidity usually is treated as a function of siliciclastic effluent from the land plus organic and inorganic nutrients in the photic zone that may enrich phytoplankton and planktivore populations. Deviations from normal marine salinity or normal temperature ranges reduce carbonate production rate exponentially. In practice, the equations used to describe the complex relations among the several variables boil down to the fact that water depth is the dominant control on carbonate productivity.

In the disclosed model embodiment of the three-dimensional carbonate model, this approach is considered unnecessarily complex and incomplete since it doesn't consider additional important ecologic and stratigraphic controls on carbonate productivity. The unnecessary complexity can be eliminated by using the following assumption. Since the carbonate model will be used with inversion on data from carbonate strata, it can be assumed that the temperature, salinity, nutrient availability and turbidity of the water mass were favorable to carbonate-producing biota. Thus, these factors can be eliminated from consideration.

There are two other factors that should be incorporated into a carbonate production algorithm. One is the stratigraphically documented relation among carbonate productivity, energy and distance from shorelines. The other is the ecologically and stratigraphically documented relation among the reproduction strategies of populations, biomass production, and ratio of total biomass converted to $CaCO_3$.

In the first case, carbonate production increases toward shorelines of the mainland and of mounds and islands. This is approximately equivalent to the increase in hydromechanical energy associated with the shoaling above fair-weather wave base. Carbonate productivity also is higher on inner ramps and platforms than on outer ramps and platforms of for water of approximately comparable depths. This is approximately equivalent to the increase in hydro-mechanical energy associated with the regeneration of kinetic energy by wind stress from storms. Both observations clearly show that water depth alone is not a good approximation of carbonate production. Whether the actual control of increased productivity in these situations is energy on the sea floor, it seems that energy is a good proxy for these water-depth-independent increases in carbonate productivity.

In the second case, carbonate production varies as a function of reproduction strategies of populations within communities. Communities dominated by r-selected populations have lower biomass than communities dominated by K-selected populations. In addition, the proportion of biomass converted to $CaCO_3$ in K-selected populations is many times higher than that converted in r-selected populations. K-selected populations are strongly dominant during base-level fall times, and r-selected populations colonize the disturbed habitats during early sea-level rise of transgressions. Thus, there is a clear stratigraphic control on the timing of the increased and decreased rates of skeletal production. In addition, the types and sizes of grains produced changes as a function of the different populations, and this has a strong affect on the texture of the sediment that accumulates. Sediments produced during r-selected times are finer, mud-rich, organic-rich and excessively micritized. By contrast, sediments produced by K-selected communities are coarser, and lack mud and micritization.

The carbonate production function, P, contains the variables of space (x, y, and sea floor elevation, H), time, and kinetic energy, F. At this point in the model development, the control on productivity of population types has not yet been fully implemented. The carbonate production function is expressed as:

$$P = P(x,y,t,H,F) \quad (14)$$

This may be rewritten without the time and spatial coordinates as:

$$P = \theta P_w + (1-\theta)P_k \quad (15)$$

where $P_w$ is the carbonate production rate influenced by effective water depth (photic zone), $P_k$ is the production rate influenced by kinetic energy, and $\theta$ is an invertible coefficient. $P_w$, $P_k$, and water depth, $W_d$, are further specified as:

$$P_w = \frac{A}{1 + e^{k_w W_d}} \quad (16)$$

$$P_k = k_f F + B \quad (17)$$

$$W_d = SL - H \quad (18)$$

where F is the kinetic energy function from equation 3, SL is sea level, H is the elevation of the sea floor, and A, B, $k_w$, and $k_f$ are invertible coefficients.

In summary, the carbonate model relates sediment production (mass), transport, erosion, and accumulation to physical energy, topography and spatial position. The Dunham texture of the sediment will be related to the kinetic energy through experimentation and inversion trials. Mass is conserved within the model.

Tectonic subsidence shapes and rates with respect to time and geographic position can now be specified by the user or determined by inversion. The model compensates for sediment and water loads with a flexure program.

To complete the carbonate model, all the terms are combined into one function that describes the accumulation of sediment in time and space. This is accomplished by first returning to the logistic equation (equation 6) for mass conservation:

$$V_{deposit} = V_{production} + V_{input} - V_{output} \quad (6)$$

$$V_{deposit} = \Delta x \Delta y \Delta h \quad (19)$$

$$V_{production} = P \Delta x \Delta y \Delta t \quad (20)$$

$$V_{input} - V_{output} = -\left(\frac{\partial q_x}{\partial x} + \frac{\partial q_y}{\partial y}\right) \Delta x \Delta y \Delta t \quad (21)$$

Substituting equations 19, 20, and 21 into equation 6 yields the following:

$$\Delta x \Delta t \Delta h = P \Delta x \Delta y \Delta t - \left(\frac{\partial q_x}{\partial x} + \frac{\partial q_y}{\partial y}\right) \Delta x \Delta y \Delta t \quad (22)$$

Dividing by x and y yields:

$$\Delta h = P \Delta t - \left(\frac{\partial q_x}{\partial x} + \frac{\partial q_y}{\partial y}\right) \Delta t \quad (23)$$

Factoring t yields:

$$\Delta h = \left[P - \left(\frac{\partial q_x}{\partial x} + \frac{\partial q_y}{\partial y}\right)\right] \Delta t \quad (24)$$

The change in elevation of the sea floor, H, is equal to the thickness of sediment, h, added or removed, plus the amount of subsidence, $S_{tect}$, during time step, t, as expressed by:

$$\Delta H = \Delta h + S_{tect} \Delta t \quad (25)$$

Solving for h yields:

$$\Delta h = \Delta H - S_{tect} \Delta t \quad (26)$$

The change in elevation, H, is equivalent to the rate of change in elevation over the time step. Thus, equation 26 may be rewritten as:

$$\Delta h = \Delta t \frac{\partial H}{\partial} - S_{tect} \Delta t \quad (27)$$

Factoring t yields:

$$\Delta h = \left(\frac{\partial H}{\partial} - S_{tect}\right) \Delta t \quad (28)$$

There are now two different expressions representing h (equations 24 and 28). Setting these two equations equal yields:

$$\left[P - \left(\frac{\partial q_x}{\partial x} + \frac{\partial q_y}{\partial y}\right)\right] \Delta t = \left(\frac{\partial H}{\partial} - S_{tect}\right) \Delta t \quad (29)$$

Dividing by t yields:

$$P - \left(\frac{\partial q_x}{\partial x} + \frac{\partial q_y}{\partial y}\right) = \frac{\partial H}{\partial} - S_{tect} \quad (30)$$

Solving for $\partial H/\partial$ yields:

$$\frac{\partial H}{\partial} = -\left(\frac{\partial q_x}{\partial x} + \frac{\partial q_y}{\partial y}\right) + P + S_{tect} \quad (31)$$

which describes the change in the sea floor elevation during a time step as a consequence of sediment flux into, and out of, the cell, plus any sediment that was produced in-place, plus the movement of the sea floor by subsidence. Substituting sediment flux terms, $q_x$ and $q_y$, and using their equivalents from equations 4 and 5, yields:

$$\frac{\partial H}{\partial} = -\left(\frac{\partial\left(-D_x\left(\rho g \frac{\partial H}{\partial x} + F\right)\right)}{\partial x} + \frac{\partial\left(-D_y\left(\rho g \frac{\partial H}{\partial y} + F\right)\right)}{\partial y}\right) + P + S_{tect} \quad (32)$$

Taking the derivative of these substituted terms, and evaluating each with respect to spatial positions x and y, yields:

$$\frac{\partial H}{\partial} = -\left(-D_x\left(\rho g \frac{\partial^2 H}{\partial x^2} + \frac{\partial F}{\partial x}\right) - D_y\left(\rho g \frac{\partial^2 H}{\partial y^2} + \frac{\partial F}{\partial y}\right)\right) + P + S_{tect} \quad (33)$$

Distributing the negative terms changes them to positive terms, represented by:

$$\frac{\partial H}{\partial} = D_x\left(\rho g \frac{\partial^2 H}{\partial x^2} + \frac{\partial F}{\partial x}\right) + D_y\left(\rho g \frac{\partial^2 H}{\partial y^2} + \frac{\partial F}{\partial y}\right) + P + S_{tect} \quad (34)$$

Multiplying and rearranging the terms such that the production and kinetic energy terms are grouped together, yields:

$$\frac{\partial H}{\partial} = D_x \rho g \frac{\partial^2 H}{\partial x^2} + D_y \rho g \frac{\partial^2 H}{\partial y^2} - D_x \frac{\partial F}{\partial x} - D_y \frac{\partial F}{\partial y} + P + S_{tect} \quad (35)$$

which is a description of sediment production, transportation, erosion and deposition together with tectonic subsidence and sea-;eve; change through time. The first two terms of equation 35 describe the potential energy at a position in space, the second two terms describe the kinetic energy at a position in space, and the last two terms describe the in-place carbonate production and subsidence, respectively, over a time step.

The carbonate model started with a description of mass conservation. Through the manipulation and substitution of representative terms, the end result is a description of the stratigraphic process or response system in terms of physical and biologic energy domains. The two domains of mass conservation and energy are convertible, and the model conserves mass. Therefore, it is possible to diffuse the combination of biological, kinetic and potential energy to produce a simulation of the distribution of sediment volumes and textures through time and space. This result yields a three-dimensional model that allows the remote prediction of stratigraphic basin attributes far from the locations where the initial source data was generated.

In the disclosed embodiment, the results of inverting the three-dimensional carbonate model on synthetic and field data sets to predict the distribution and geometry of carbonate rocks between and beyond control points is summarized in FIGS. 3 through 10c. In these examples, a simulated annealing algorithm was used for the inverse method. Those persons skilled in the art will recognize that a variety of algorithms could have been selected to execute the disclosed invention and many were discussed in the section above. Using the simulated annealing algorithm method, about 900 to 1200 forward simulations were run to achieve successful results. In all cases, correct values of model parameters were recovered and a smooth convergence to a unique solution was achieved.

Figure 3:
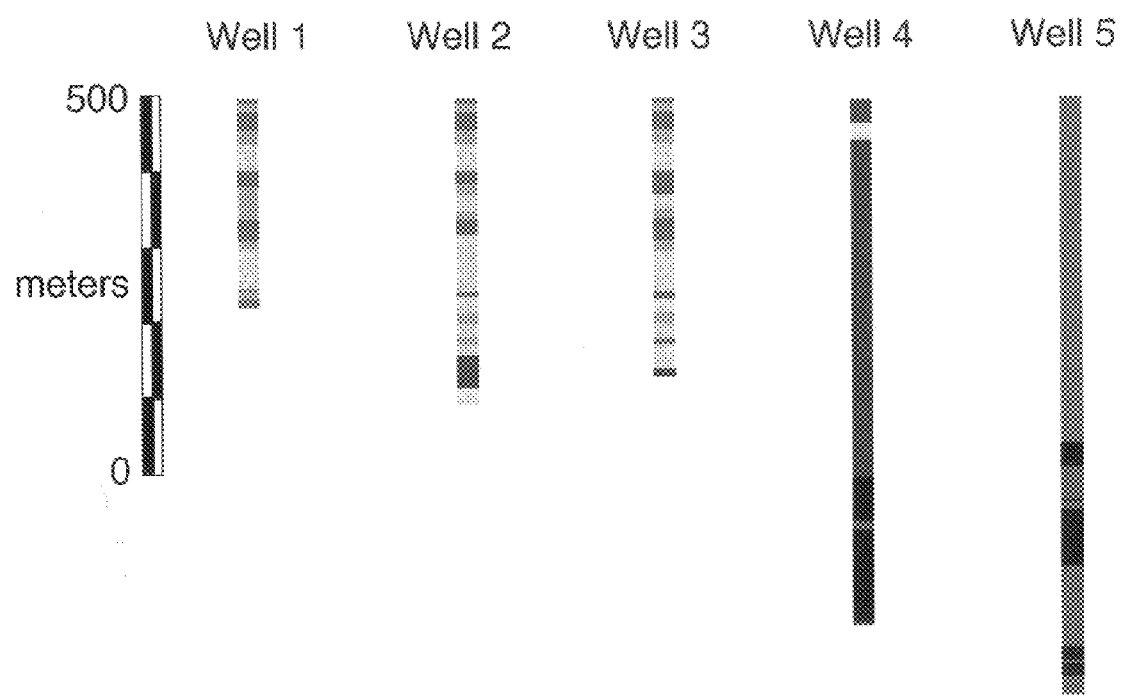
FIG. 3 is an illustration of the input data gathered for the observation files consisting of a succession of carbonate rock types through a vertical section, as in an oil/gas well or an outcrop. Examples from 5 wells are shown. Colors represent rock types as categorized in FIG. 4.
Figure 4:
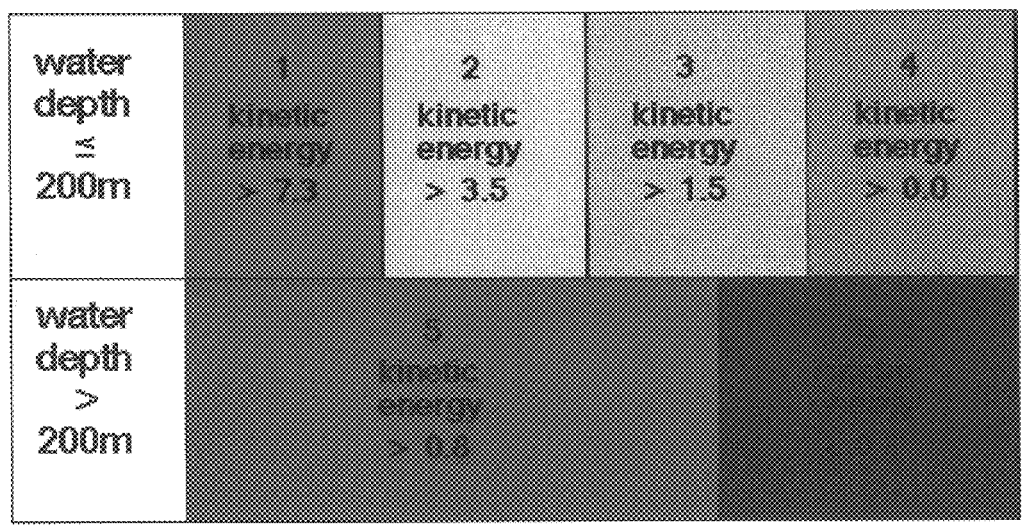
FIG. 4 is an illustration of the carbonate rock types coded as a function of hydromechanical energy on the sea floor and water depth.

FIG. 3 shows examples of input data for the observation files consisting of thickness of a succession of carbonate rock types through a vertical section, that could be taken from an oil/gas well or an outcrop. In FIG. 4, carbonate rock types were coded as a function of hydromechanical energy on the sea floor and water depth. The number of facies and their depth and energy range is completely flexible, and these parameters are invertible. This method of coding is a numerical representation of the commonly used Dunham (1961) classification by depositional texture (e.g., shallow-shelf mud-free coarse grainy rocks; deep-shelf mud-rich skeletal rocks) and paleogeographic position within a carbonate shelf and basin.

In the synthetic example, a forward model was run that looks similar to some known stratigraphical configuration to assure that a realistic synthetic example was being used. This created a three-dimensional world in which the distribution and geometry of different rock types and the values of forward model parameters were known completely. The synthetic three-dimensional model was then treated as if it were a real field case study, and it was fictitiously assumed that there was only information from a few wells within the three-dimensional volume available. The vertical samples (simulated wells) from the three-dimensional model were then taken and treated as though they were real wells, and only the data from those wells was inverted.

Figure 5:
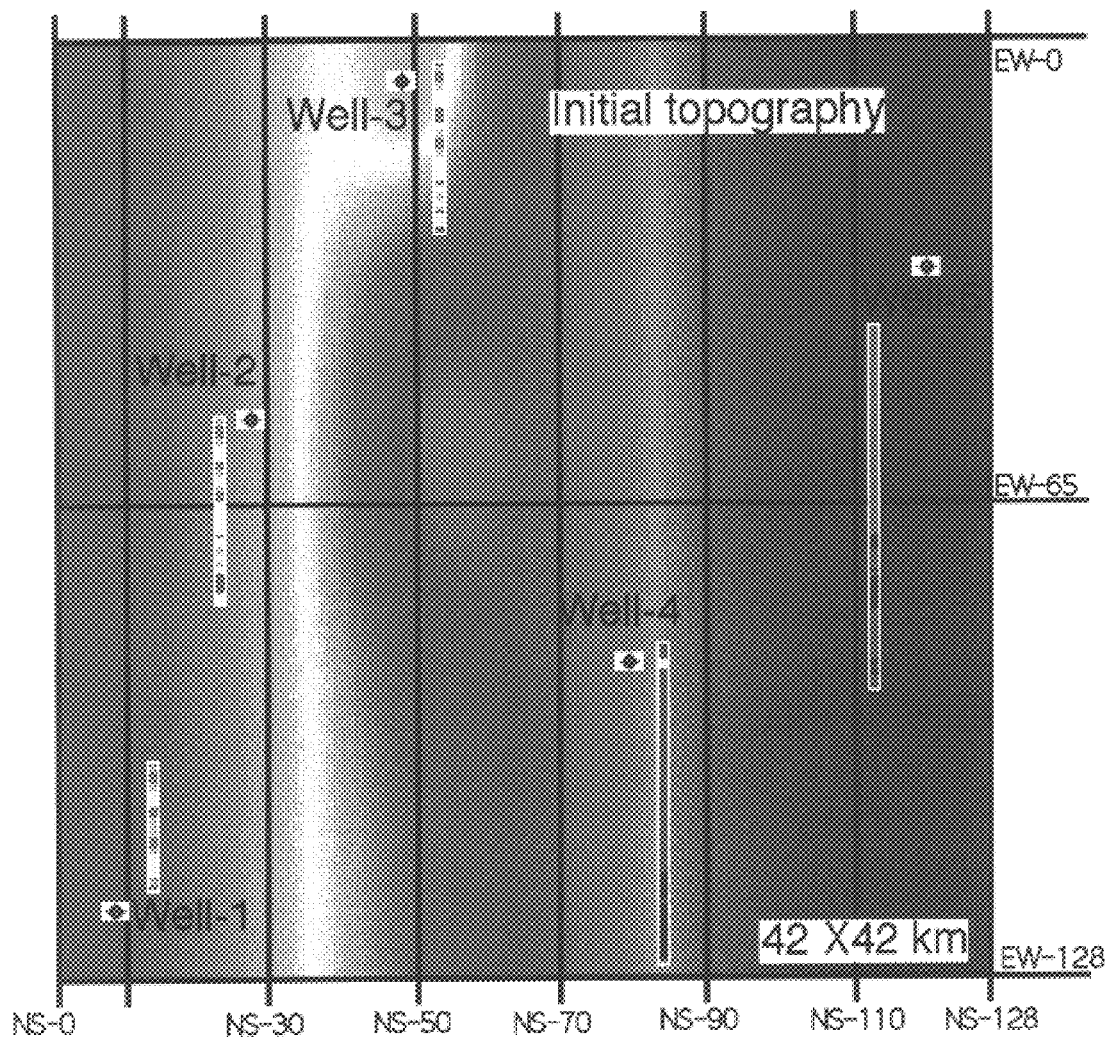
FIG. 5 shows five exemplary wells located within a 42 km×42 km model area.
Figure 6A:
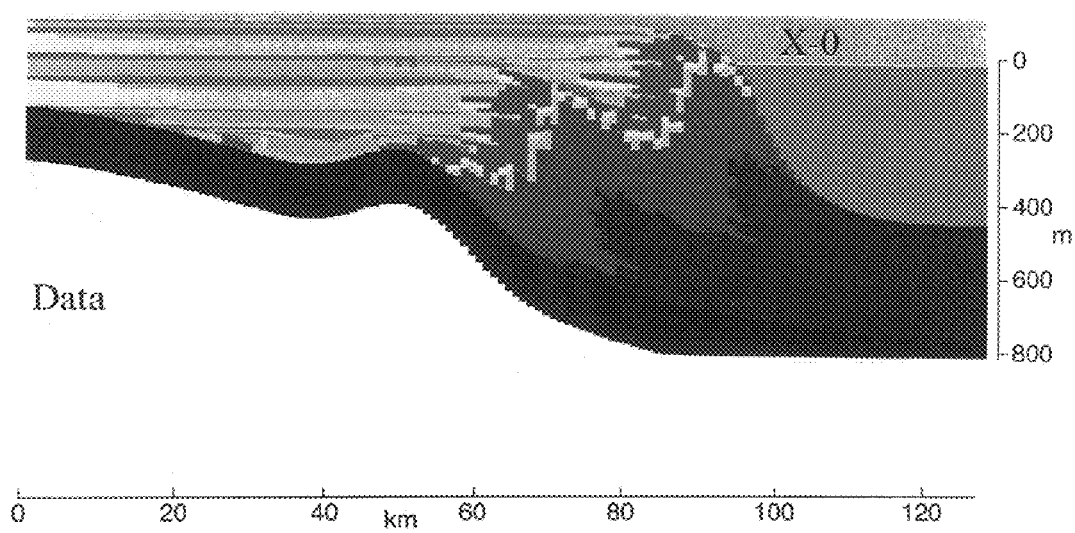
FIGS. 6a and 6b, 7a and 7b, and 8a and 8b illustrate results of the inversion as compared to the original model predicted by the input data as shown by comparing stratigraphic cross sections at three positions through the original and the inverted model.
Figure 6B:
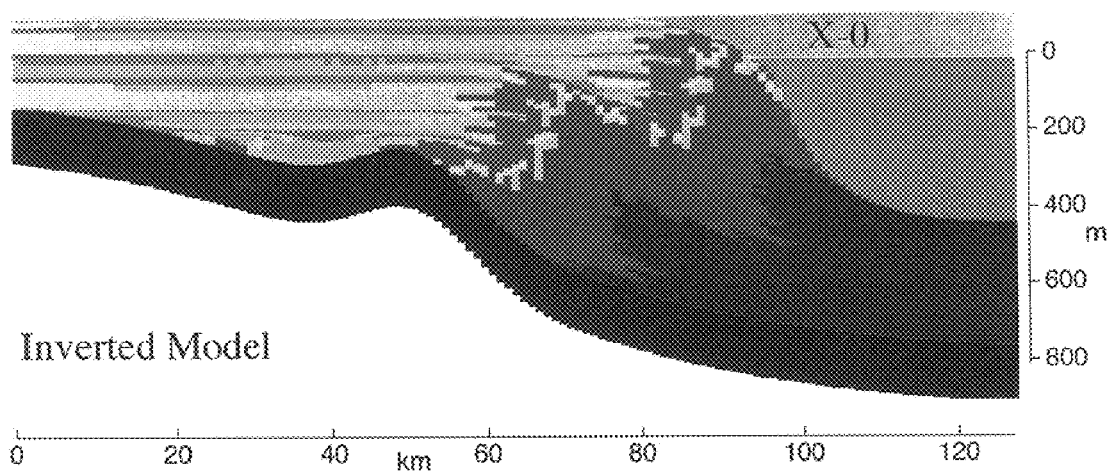
Figure 7A:
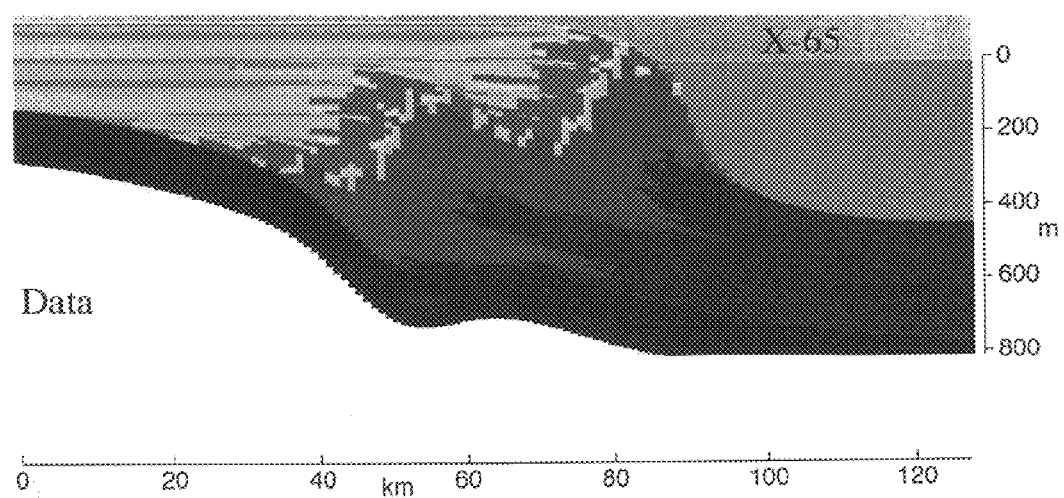
Figure 7B:
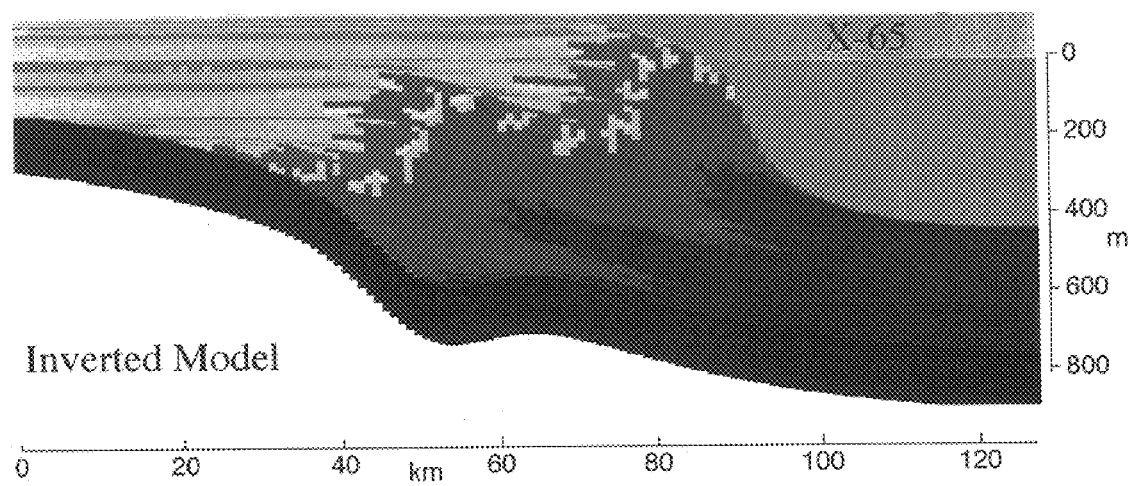
Figure 8A:
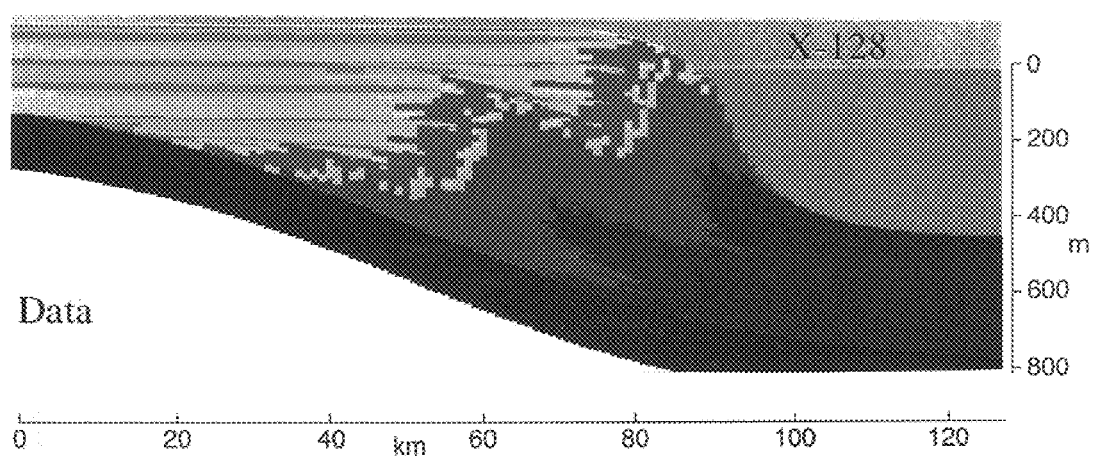
Figure 8B:
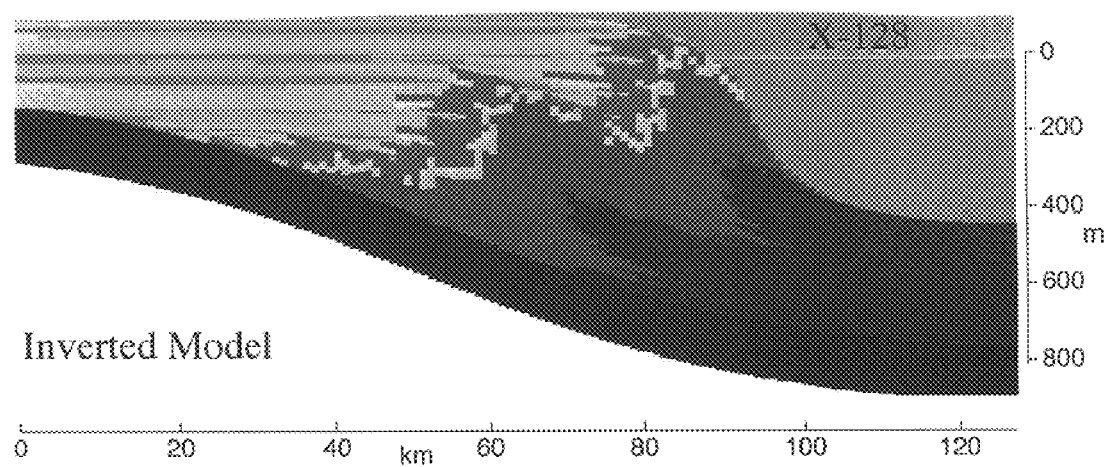

The start and finish of an inverse model using the synthetic data are shown in FIGS. 5–8b. FIG. 5 shows locations of five wells within a 42 km×42 km model area. The colors on the columns at each well location represents the vertical succession and thickness of rock types in each well. The colors on the map show the bathymetry at the start of the model, with hot colors representing shallow water and cold colors representing deep water. The goal is to take the data from the five synthetic wells, run the inversion, and determine whether the inverse model can correctly recover the values of forward model parameters and correctly simulate the rock type distribution and geometry in the basin when initially given wrong values for the parameters. As stated previously, in the synthetic model, the values of all parameters and the distribution and geometry of rock types within the model are known. Thus, it is easy to compare how well the inverse model recovers the true values.

FIGS. 6a–8b show the results of the inversion by comparing vertical slices through the original and the inverted models. The vertical slices, or stratigraphic cross sections, are located at the three positions indicated by the heavy "east-west" lines, labeled X-0, X-65, and X-128. FIGS. 6a–8b show the very close match between the original model (top sections labeled 6a, 7a and 8a) and the inverted solution (bottom sections labeled 6b, 7b and 8b).

Figures 9A, 9B:
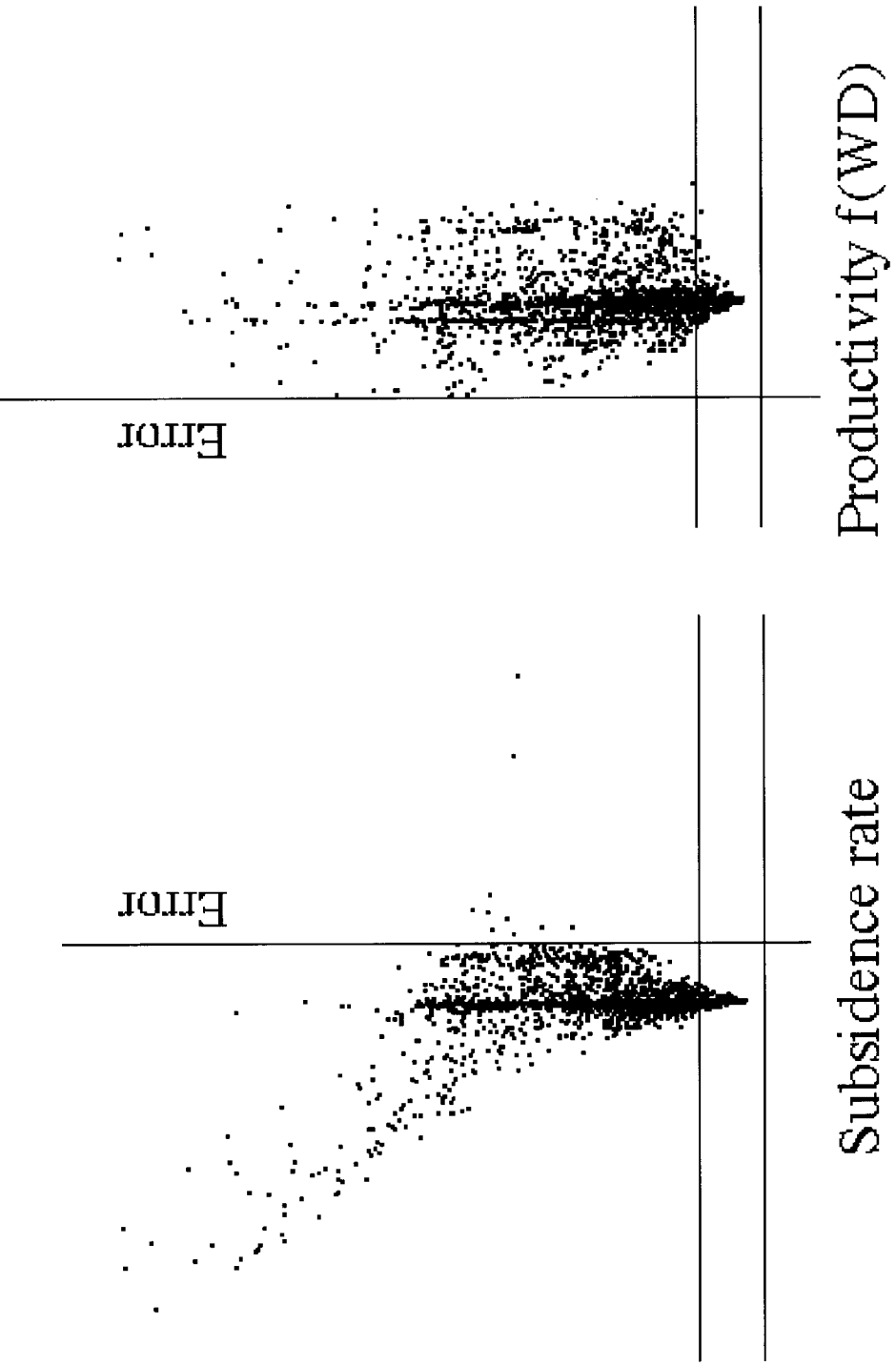
FIGS. 9a and 9b are examples of typical objective functions (also known as loss surfaces or error surfaces) displaying the range of errors and the calculated parameter values by about 1000 forward model runs during an inverse model run.

FIG. 9 shows two examples of typical objective functions (also known as loss surfaces or error surfaces). This figure displays the range of errors and the calculated parameter values produced by about 1000 forward model runs during an inverse model run. The horizontal axis is the range in values of a model parameter, in this case, the rate of subsidence and the rate of carbonate productivity as a function of water depth. The vertical axis is the range in values of errors (sum of the root mean square of predicted value minus true value), with errors increasing upward. The important point about this figure is that, after the inverse model searches for solutions which minimize errors in n-dimensional parameter space, it converges on a single nearly unique (low error) value of model parameters. In all cases of inversion on synthetic data, the inverse model has been able to recover the correct values of model parameters with narrow ranges of error and uncertainty and, consequently, has produced correct simulations.

Figure 10A:
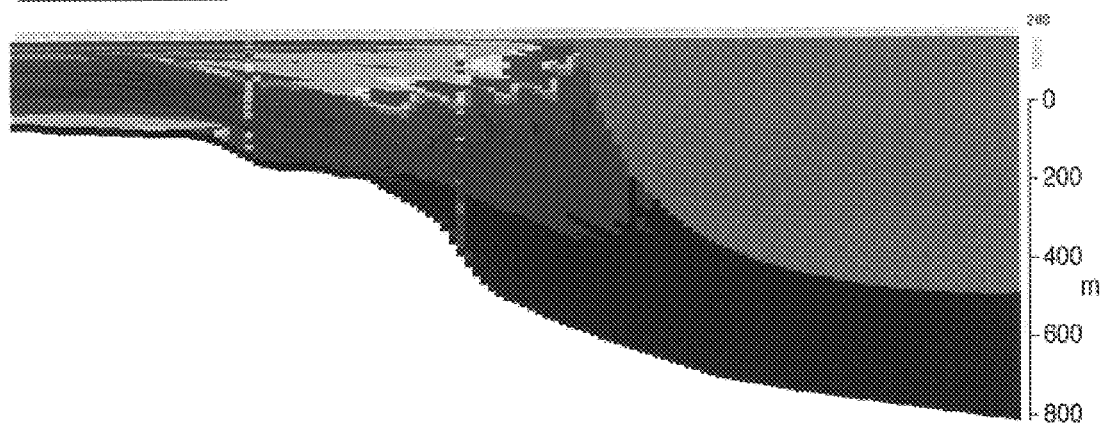
FIGS. 10a, 10b and 10c illustrate the results of an inversion shown as a detailed cross section through the Bahama Bank created from facies successions and thickness in wells and compared with seismic changes of the same area.
Figure 10B:
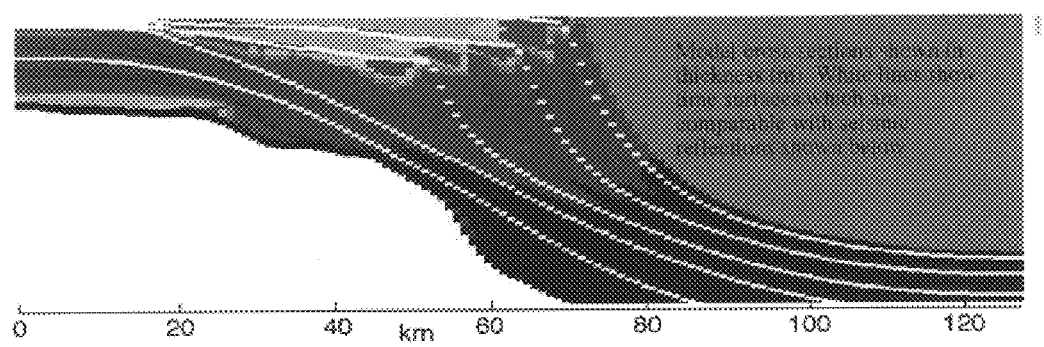
Figure 10C:
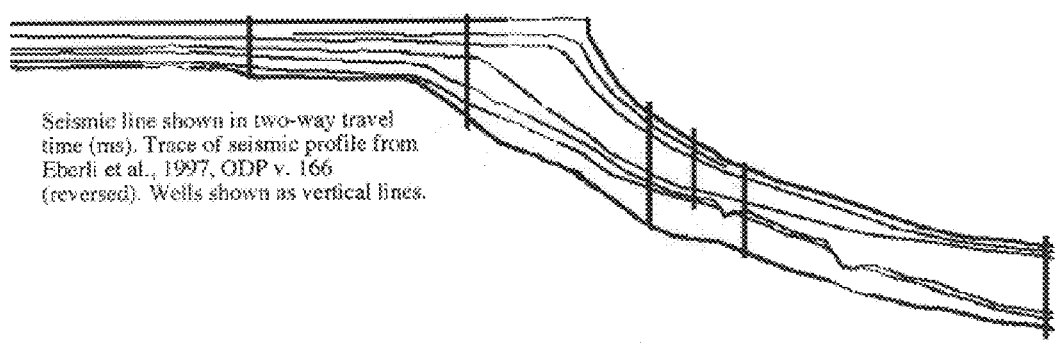

FIGS. 10a and 10b show the results of an inversion on a field example. A detailed cross section through the Bahama Bank created from well and seismic data is shown in FIG. 10a. Four wells drilled along this line of section were cored and the succession of thickness of rock types were described. FIG. 10b shows the results of inversion using only the data from the four wells. Again, like the synthetic examples, the inverse model is able to make a simulation that is very close to the observed model.

The foregoing description is considered as illustrative only of the principles of this invention. Further, since numerous modifications and changes will readily occur to those persons skilled in the art, it is not desired to limit the invention to the exact construction and process shown as described above. Accordingly, all suitable modifications and equivalents may be resorted to falling within the scope of the invention as defined by the claims that follow.

The words "comprise," "comprising," "include," "including," and "includes," when used in this specification and in the following claims, are intended to specify the presence of stated features, integers, components, or steps, but they do not preclude the presence or addition of one or more other features, integers, components, steps, or groups thereof.

What is claimed is:

1. A method to predict one or more stratigraphic attributes at a plurality of locations within a three-dimensional volume in a sedimentary basin, the method comprising the steps of:

(a) obtaining a set of real stratigraphic data comprising sedimentologic and stratigraphic attributes from at least one location within the volume;

(b) employing a stratigraphic forward model that includes a conservation of mass constraint;

(c) employing a numerical inverse optimization technique that, after an initial guess of a group of forward model parameter values is established, iteratively runs the forward model, compares output from the forward model with similar data types from the set of real data, and adjusts the group of forward model parameter values such that successive iterations more closely match the sedimentologic and stratigraphic attributes from the set of real data until an optimal solution comprising a best combination of forward model parameter values is generated that satisfies a predetermined variance threshold;

(d) inputting the best combination of forward model parameter values back into the forward model to output a complete model of stratigraphic attributes for a plurality of locations within the three-dimensional volume.

2. The method of claim 1, wherein the set of real data of step (a) further comprises at least one of the following types: core samples, cuttings, geophysical well logs and seismic data.

3. The method of claim 1, wherein the set of real data of claim (a) further comprises at least one of the following types of information or inference:

rock type, including one or more compositional, constituent particles, textural, fabric, fossil and petrophysical attributes;

facies thickness and successions;

stratigraphic cycles;

cycle symmetry; correlations of stratigraphic cycles;

stratigraphic geometry and dimensions of rock bodies;

inferred paleotopography or paleobathymetry;

inferred sea level and/or subsidence history;

lithosphere strength and flexural compensation to loads.

4. The method of claim 1, wherein the forward model of claim (b) further comprises a flexure algorithm to compensate for sediment and water loads.

5. The method of claim 1, wherein the numerical inverse optimization technique of step (c) is one of the group consisting of a genetic inverse algorithm, a simulated annealing inverse algorithm, a gradient descent inverse algorithm, a Lerche technique inverse algorithm, or a Monte Carlo algorithm.

6. The method of claim 1, wherein the initial guess of the group of forward model parameter values of step (c) further comprises scale and volume limitations ranging from reservoir size to basin size.

* * * * *